United States Patent [19]

Steele

[11] Patent Number: 4,773,696
[45] Date of Patent: Sep. 27, 1988

[54] GLARE CUTTER DEVICE

[76] Inventor: Harry C. Steele, 2625 Algonquin Ave., Ashland, Ky. 41101

[21] Appl. No.: 63,083

[22] Filed: Jun. 17, 1987

[51] Int. Cl.$^4$ ................................................ B60J 3/00
[52] U.S. Cl. .................................... 296/97.7; 296/97.9
[58] Field of Search .............. 296/97 R, 97 B, 97 C, 296/97 D, 97 E, 97 F, 97 G, 97 J, 97 H, 84 B, 97 K

[56] References Cited

U.S. PATENT DOCUMENTS

| | | | |
|---|---|---|---|
| 1,606,853 | 11/1926 | Trisler | 296/97 D |
| 1,610,305 | 4/1925 | Muncie | 296/97 D |
| 1,781,777 | 11/1930 | Conner | 296/97 G X |
| 1,953,877 | 10/1932 | Chase | 296/97 |
| 2,632,669 | 8/1946 | Piwczynski et al. | 296/97 |
| 2,715,043 | 4/1952 | Schewel | 296/97 |
| 2,723,823 | 11/1955 | Polk, Jr. | 296/97 E |
| 3,254,435 | 2/1965 | Rix | 40/129 |

FOREIGN PATENT DOCUMENTS

| | | | |
|---|---|---|---|
| 1516227 | 3/1968 | France | 296/97 F |
| 538602 | 11/1931 | Fed. Rep. of Germany | 296/97 D |
| 3008047 | 9/1981 | Fed. Rep. of Germany | 296/97 F |
| 578577 | 1/1958 | Italy | 296/97 D |

Primary Examiner—Robert B. Reeves
Assistant Examiner—Russell D. Stormer
Attorney, Agent, or Firm—Shoemaker and Mattare, Ltd.

[57] ABSTRACT

A glare control device for attachment to the inside of a vehicle windshield by a suction cup. An elongated plastic strip is pivotally mounted from the suction cup and attached thereto by a thumbscrew with washer shoulder thereon for ease of maneuvering and adjustment of the device. The end of the strip near the pivotal mount is permanently formed with a twist thereto in the range of 30° to 55° so that when the suction cup is mounted inside a windshield of approximately a 40° to 45° slant, the main portion of the glare cutter device will be substantially perpendicular to the line of sight of a driver of the vehicle.

6 Claims, 1 Drawing Sheet

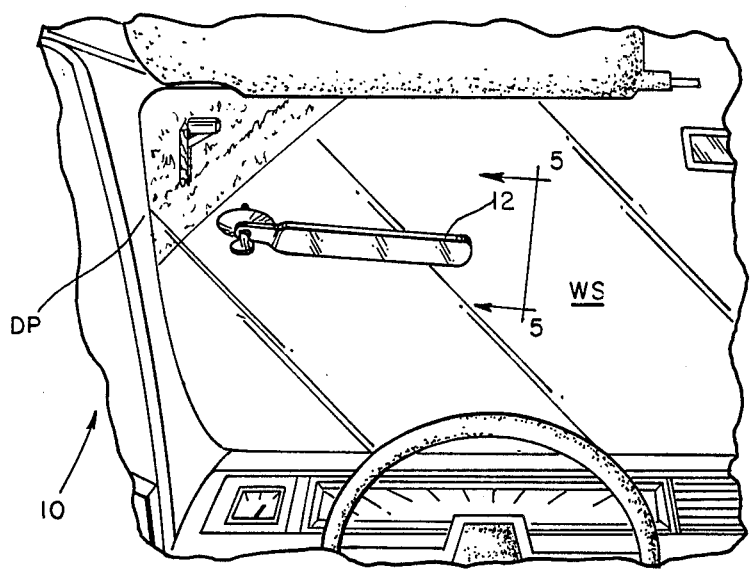
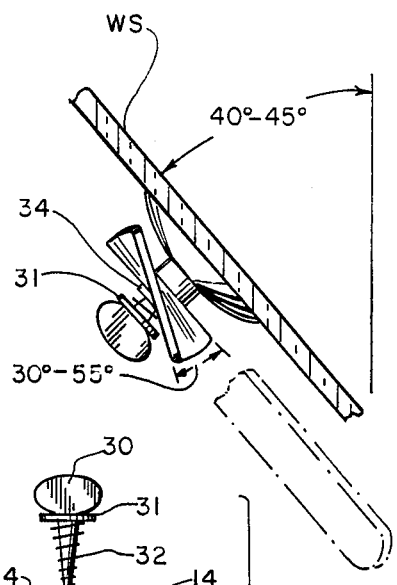
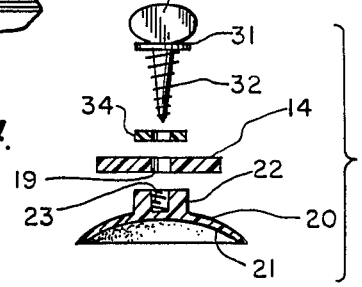
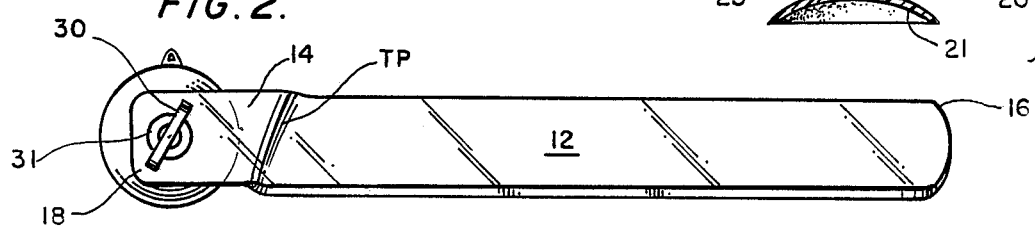
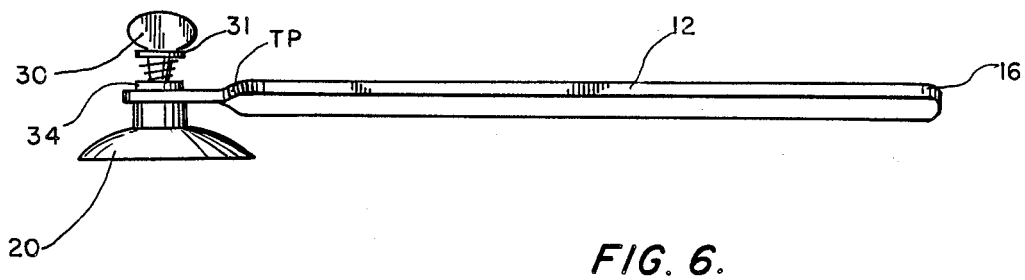
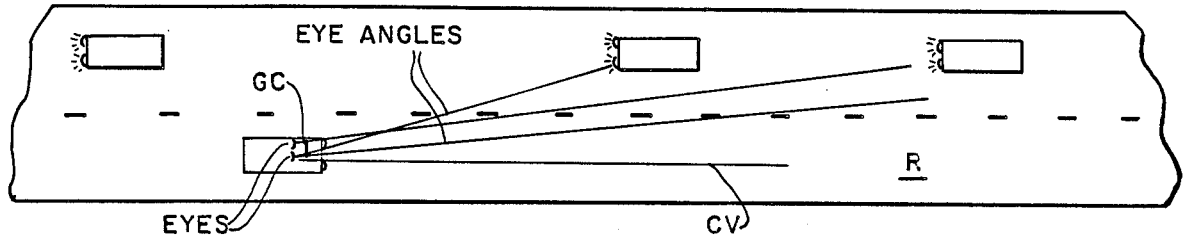

GLARE CUTTER DEVICE

BACKGROUND OF THE INVENTION

1. Field of the Invention

This invention relates generally to devices for cutting glare from the lights of oncoming vehicles and the like for use on the windshield of a motor vehicle.

2. Description of the Prior Art

A common problem with known types of shielding devices for use with motor vehicles and the like is that they oftentimes are large and bulky and substantially reduce the scope of vision of a driver of the vehicle more than they should.

Another problem with known type glare reducing devices is that they are not only unduly bulky and cumbersome, but they also are not easily detached and removed and/or are not easily adjusted.

Existing prior patents which may be pertinent to the present invention are as follows:

3,254,435—6/ 766—Rix
2,715,043—8/ 9/55—Schewel
2,632,669—3/24/53—Piwczynski et al
1,953,877—4/ 3/34—Chase
1,610,305—12/14/26—Muncie These patents generally show glare shields for use with the windshields of motor vehicles and the like; however, they all have the problems already set forth. None of the known prior art devices offer the new and novel features of the present invention.

SUMMARY OF THE INVENTION

An object of the present invention is to provide a glare cutter device for detachable mounting upon the sloping windshield of a motor vehicle which is designed so that the main portion of the device will when in use be substantially perpendicular to the line of sight of a driver of the vehicle.

Another object of the present invention is to provide an easily installed and adjusted glare cutter for windshields of vehicles.

A further object of this invention is to provide an easily and quickly installed glare cutter device having a suction cup for mounting upon a sloping windshield of a vehicle, which device can be easily adjusted to various angles during use thereof, and which will have the bulk of the working area of the device traverse to the line of sight of the vehicle driver.

Another further object of the present invention is to provide a glare cutter device which will effectively block unwanted light from reaching the eyes of a user, but not substantially interfere with the overall vision of the driver.

The present invention has a number of new and novel features. An elongated member of plastic composition having a substantial tint thereto is pivotally mounted on a suction cup support attachment for mounting of the overall device inside the sloping windshield of a motor vehicle or the like. An important feature of this device is that adjacent the pivotal mounting the elongated member is substantially and permanently twisted so that the operating portion of the glare cutting elongated member will be substantially traverse to, or perpendicular to, the line of sight of the vehicle driver. This is very important for maximum effectiveness and performance. Also, by this arrangement, the glare of oncoming lights, road reflections and the like can be substantially reduced without impairing the overall visibility and vision of the driver of the majority of the road ahead. A thumbscrew with shoulder on the fastener stud for the pivotal mount also provides easy control and movability of the suction cup on the windshield.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a view of the device of the present invention as in use on the windshield of a motor vehicle.

FIG. 2 is a top plan view of the device per se.

FIG. 3 is a side elevational view of the device of FIG. 2.

FIG. 4 is a side elevational view, partly in cross-section, of the suction cup and thumbscrew pivot mount per se.

FIG. 5 is a fragmentary sectional view, partly in cross-section, taken generally along line 5—5 of FIG. 1.

FIG. 6 is a diagrammatic showing of how the device functions in actual use.

DESCRIPTION OF THE PREFERRED EMBODIMENT

Referring to FIG. 1 of the drawing, reference numeral 10 indicates in general the glare cutter of the present invention. FIGS. 2-5 show the device of the present invention in greater detail.

An elongated member 12 has a short mounting portion 14 at one end thereof. Between the mounting portion 14 and the main portion of member 12 is a permanently deformed or twisted portion TP. The range of usable angles for this twist is preferably from 30° to 55° as depicted in FIG. 5. However, the majority of windshields of late model vehicles in use today have a slope of 40° to 45°. Therefore, the twist preferably is in this more limited range. However, for certain sports vehicles and other specialty applications, a different angle may be desired. Preferably, the corners 16 of the elongated member 12 are rounded with similar rounded corners 18 for the mounting portion 14. An aperture 19 is provided in the mounting portion 14 for receiving the pivot screw 32.

A suction cup 20 is provided for attachment and mounting of the overall device to a sloping windshield. Preferably, this suction cup has a screw receiving friction head 22 opposite the cup portion 21 thereof. This head 22 will function to frictionally retain the mounting portion 14 in adjusted position when the glare cutter device is mounted on pivot screw 32 which is then attached to the suction cup. Thumbscrew 32 has threads which are screwed into aperture 23 in the suction cup. An enlarged flat head 30 can be easily gripped by a user's fingers. Preferably, the thumbscrew has a shoulder 31 therewith for frictional engagement with washer 34 for frictionally holding portion 14 of the glare cutter.

As best seen in FIG. 5, when the glare cutter is mounted on the windshield and in position for use, the bulk of the operating area of portion 12 will be traverse to the line of sight of a driver. However, when the device is swung up or down to be adjacent the vehicle door pillar DP, then the edge view which is substantially flat will be viewed as seen in the dotted line portion of FIG. 5.

This strip can also be used to block glare from the sun on the highway (see FIG. 6). The strip only extends from the left side of the driver to the center of the highway so that it does not block the view of the driver on the right side of the road. The suction cup can be mounted a little higher horizontally in order for the strip to be angled down about 20°. This enables the driver to see under the strip when turning to the left. This strip can also be used when driving in the rain, as it cuts out the glare from the lights on the windshield. This makes this item good for day or night, rain or shine. When not needed, the strip can be moved down or up out of the way. Since the strip is narrow, it does not interfere with long range or short range vision. It simply cuts out the glare from headlights in the exact distance that would bother one. Since this strip is movable in all directions, it can be used by any person on any vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A glare cutting device for mounting to the inside surface of a windshield of a vehicle to reduce glare in the eyes of a driver of the vehicle, comprising:
    a suction cup for attachment to an inside surface of a vehicle windshield;
    an elongate, thin, narrow, tinted glare shield of semi-transparent material and having a generally rectangularly shaped main body portion and a mounting end, said mounting end being twisted relative to the main body portion about the longitudinal axis of the glare shield so that the plane of the main body portion is angularly displaced in the range of from about 30° up to about 55° relative to the plane of the mounting end; and
    fastening means for attaching the mounting end of the glare shield to the suction cup so that the plane of the elongate main body portion is positioned perpendicular to the line of sight of the driver of the vehicle when the glare shield is in normal position during use, and said fastening means and twisted mounted end enabling the glare shield to be rotated about an axis extending perpendicularly through the mounting end, so that when the glare shield is not in use it can be displaced to one side of the windshield and the main body portion will be positioned so that the edge thereof is presented to the line of sight of the driver.

2. The glare cutting device as claimed in claim 1, wherein:
    said suction cup has an integral friction head, and the fastening means comprises an aperture through the mounting end of the glare shield, with a threaded fastener extended through the aperture and into the friction head of the suction cup.

3. The glare cutting device as claimed in claim 2, wherein:
    the threaded fastener comprises a thumbscrew with a shoulder thereon, and a friction washer is engaged between the shoulder and the mounting end of the glare shield.

4. The glare cutting device as claimed in claim 3, wherein:
    the angle of twist of the mounting end, or angle of displacement of the plane of the main body portion relative to the mounting end, is approximately 45°.

5. The glare cutting device as claimed in claim 4, wherein:
    the material of which said glare cutting device is made comprises tinted synthetic plastic.

6. The glare cutting device as claimed in claim 5, wherein:
    the glare cutting device has a size such that when it is mounted at or near the left-hand side of a vehicle windshield, the right-hand end of the main body portion is approximately on the line of sight of the driver of the vehicle to the center of a roadway on which the vehicle is travelling.

* * * * *